United States Patent [19]

Häfele et al.

[11] Patent Number: 4,459,086

[45] Date of Patent: Jul. 10, 1984

[54] FUEL INJECTION PUMP FOR INTERNAL COMBUSTION ENGINES

[75] Inventors: Walter Häfele, Fellbach; Bernhard Schenk, Stuttgart, both of Fed. Rep. of Germany

[73] Assignee: Robert Bosch GmbH, Stuttgart, Fed. Rep. of Germany

[21] Appl. No.: 411,227

[22] Filed: Aug. 25, 1982

[30] Foreign Application Priority Data

Sep. 4, 1981 [DE] Fed. Rep. of Germany ....... 3134971
Jun. 5, 1982 [DE] Fed. Rep. of Germany ....... 3221405

[51] Int. Cl.³ ...................... F02M 59/46; F16K 17/26
[52] U.S. Cl. ................................ 417/296; 137/493.5
[58] Field of Search ..................... 417/296; 137/493.2, 137/493.3, 493.4, 493.5

[56] References Cited

U.S. PATENT DOCUMENTS

| | | | |
|---|---|---|---|
| 1,999,967 | 4/1935 | Miller et al. | 137/493.3 |
| 2,247,421 | 7/1941 | Tabb et al. | 123/467 X |
| 3,195,465 | 7/1965 | Hug | 417/296 |
| 3,309,024 | 3/1967 | Maddalozzo | 239/5 |
| 3,364,863 | 1/1968 | Olszewski et al. | 417/503 X |

FOREIGN PATENT DOCUMENTS

| | | | |
|---|---|---|---|
| 1202545 | 10/1965 | Fed. Rep. of Germany | 417/296 |

*Primary Examiner*—Richard E. Gluck
*Attorney, Agent, or Firm*—Edwin E. Greigg

[57] ABSTRACT

The support of a relief valve in a constant pressure relief valve of the fuel injection pump comprises a bolt and two openings for receiving it in the sheath-like wall of the movable valve closing body. The openings are embodied by a bore drilled through the wall of the valve closing body at right angles to the longitudinal axis of the valve closing body. The bolt receives a spring plate of a spring of the relief valve in a depression and is thereby positioned and secured.

2 Claims, 2 Drawing Figures

Fig. 1
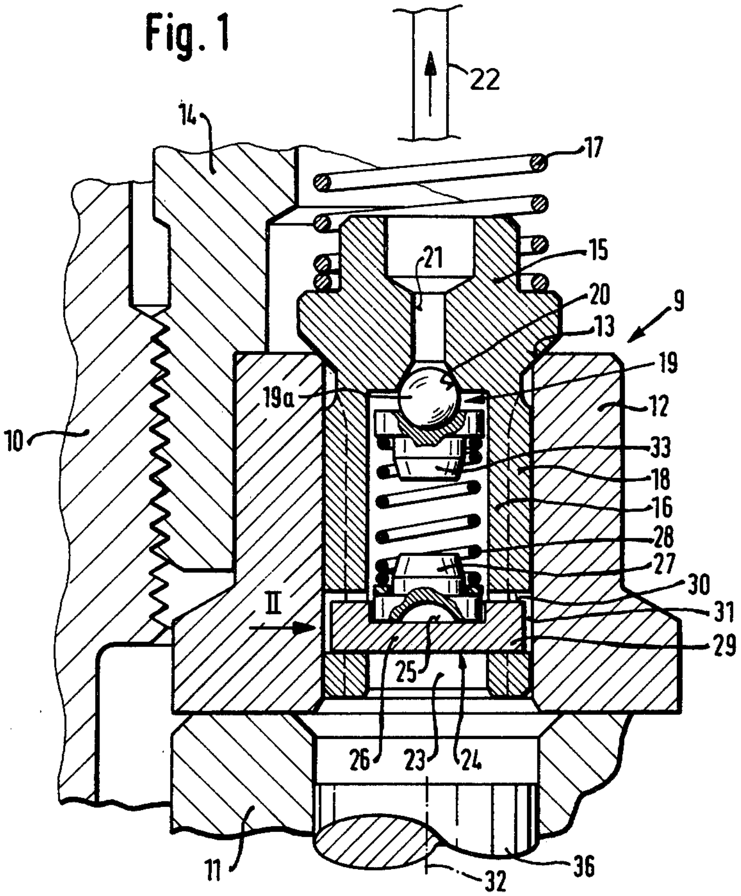
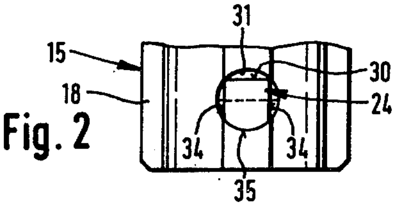
Fig. 2

FUEL INJECTION PUMP FOR INTERNAL COMBUSTION ENGINES

BACKGROUND OF THE INVENTION

The invention is based on a fuel injection pump for internal combustion engines as generally described hereinafter. In known injection pumps equipped with a constant pressure relief valve (Swiss Pat. No. 394,710 corresponding to U.S. Pat. No. 3,195,465), the spring of the relief valve is supported via a threaded element which is secured in the sheath-like section of the valve closing body. The disadvantage of this screw connection is that because it may loosen, reliable functioning of the injection pump is not always assured, because parts of the valve may fall into the pump work chamber and cause grave damage to the injection pump as well as attendant damage to the engine itself.

OBJECT AND SUMMARY OF THE INVENTION

With the fuel injection pump for internal combustion engines according to the invention, the disadvantage of the prior art is reliably avoided using simple means, even under unfavorable operating conditions. The fundamental concept of the invention is the utilization of the hollow-cylindrical wall of the valve closing body as a support means.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows a section of a fuel injection pump having the constant pressure relief valve according to the invention shown on an enlarged scale; and FIG. 2 is a partial view of the valve closing body, seen in the direction of the arrow II of FIG. 1.

DESCRIPTION OF THE PREFERRED EMBODIMENT

As part of a fuel injection pump, FIG. 1 shows a pressure valve 9 functioning as a constant pressure relief valve, the valve carrier 12 is secured with an annular valve seat face 13 between a cylindrical sleeve 11 and a pressure piece 14 inside a pump housing 10. A movable valve closing body 15 is pressed with its annular valve closing face 13 against the valve carrier 12 via a restoring spring 17 and has a hollow-cylindrical wall 16, which is guided via a plurality of ribs 18 in the valve carrier 12.

A relief valve 19 functioning as a check valve is substantially embodied by a valve closing member 19*a*, having the form of a ball, and a circular-annular valve closing face 20 of the valve closing body 15. The valve closing body 15 has a widening conduit 21, which discharges into a pressure line symbolized by reference numeral 22, which leads to an injection valve (not shown). A piston 36 guided in the cylinder sleeve 11 and shown only in part defines a work chamber 23 for the fuel which is to be injected. The movable valve closing member 19 is pressed by a spring 28, via a first spring plate 33, against the valve closing face 20 of the valve closing body 15 and is supported by means of a second spring plate 27 on a bracket which in the illustrated example is embodied by a bolt 24.

The bolt 24 has a substantially circular cross section at its base and in its center portion 26 it has a flat depression 25, which receives the spring plate 27 of the spring 28, and each of the two end sections 29 of the bolt 24 has a separate flattened area 30, these being disposed in a plane which is parallel to that of the depression 25. Two diametrically opposed openings 31 in the hollow-cylindrical wall 16 serve as the support means for the bolt 24, being embodied by a bore passing through the valve closing body 15 at right angles to a longitudinal axis 32.

The two end sections 29 of the bolt 24 are supported in the openings 31. In order to enlarge the return-flow cross section, the bolt 24 is additionally provided with two lateral flattened areas 34 extending parallel to both its longitudinal axis and the longitudinal axis of the valve closing body 15 (see FIG. 2). Because of this shaping, which improves the throughput, the bolt 24 can also be manipulated and mounted more easily, and it can also be manufactured as an inexpensive cast element. Since the diameter of the cross section of the base of the bolt 24 is selected to be equal to that of the bores 31, a sufficiently large abutment area 35, in the form of a section of a cylindrical jacket face, remains for supporting the bolt 24 in the bores 31.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A fuel injection pump for internal combustion engines having a piston defining a work chamber and having a constant pressure relief valve disposed in a pressure line, a valve closing means of said pressure valve opening in the supply direction of the fuel counter to the force of a restoring spring and arranged in a valve carrier means and provided with a relief valve means, a movable valve-closing member of said relief valve means opening against the supply direction of the fuel and biased by a spring means supported on said valve closing means against a valve seat face disposed in a bore of said valve closing means, and a bolt means positioned into two openings disposed at right angles to the longitudinal axis of said valve closing means in the wall of said constant pressure relief valve, said openings receiving said bolt means comprise a bore drilled through the cylindrical wall of said valve closing means at right angles to the longitudinal axis of said valve closing means, and said spring means cooperating with said movable valve-closing member of said relief valve means being supported on a central section of said bolt means by interposition of a spring plate means, wherein said bolt means is provided with a depression in said central section for receiving said spring plate means, and wherein said bolt means is in the form of a bar whose basic cross sectional configuration is that of a circular surface, the diameter of which corresponds to the diameter of said bore, and said bar having two end sections each having at least one flattened zone disposed in a plane parallel to the plane of said depression.

2. A pump as defined by claim 1, wherein said bar further comprises two flattened zones disposed parallel to its longitudinal axis and to the longitudinal axis of said valve closing means and is supported in said openings by means of an abutment face comprising a section of a cylindrical jacket face.

* * * * *